(12) United States Patent
Choi et al.

(10) Patent No.: US 12,299,400 B2
(45) Date of Patent: May 13, 2025

(54) ELECTRONIC DEVICE AND METHOD FOR CONTROLLING THEREOF

(71) Applicant: SAMSUNG ELECTRONICS CO., LTD., Suwon-si (KR)

(72) Inventors: Wonjong Choi, Suwon-si (KR); Soofeel Kim, Suwon-si (KR); Yewon Park, Seoul (KR); Jina Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 17/741,105

(22) Filed: May 10, 2022

(65) Prior Publication Data

US 2022/0269866 A1     Aug. 25, 2022

Related U.S. Application Data

(63) Continuation of application No. PCT/KR2022/002315, filed on Feb. 17, 2022.

(30) Foreign Application Priority Data

Feb. 17, 2021  (KR) .................. 10-2021-0021116
Jan. 14, 2022  (KR) .................. 10-2022-0006094

(51) Int. Cl.
*G06F 40/30* (2020.01)
*G06F 40/58* (2020.01)
*H04L 51/02* (2022.01)

(52) U.S. Cl.
CPC .............. *G06F 40/30* (2020.01); *G06F 40/58* (2020.01); *H04L 51/02* (2013.01)

(58) Field of Classification Search
CPC ........ G06F 40/30; G06F 40/58; G06F 40/205; H04L 51/02

(Continued)

(56) References Cited

U.S. PATENT DOCUMENTS 7,299,032 B2 * 11/2007 Yamada ............ H04M 1/72448
                                                  709/200
8,015,136 B1 *  9/2011 Baker ..................... G16H 10/60
                                                  706/45

(Continued)

FOREIGN PATENT DOCUMENTS

JP        2015-61116 A      3/2015
KR   10-2013-0035572 A      4/2013

(Continued)

OTHER PUBLICATIONS

International Search Report dated May 31, 2022 issued by the International Searching Authority in counterpart International Application No. PCT/KR2022/002315 (PCT/ISA/210).

(Continued)

*Primary Examiner* — Thuykhanh Le
(74) *Attorney, Agent, or Firm* — Sughrue Mion, PLLC (57) ABSTRACT

An electronic device and a control method thereof are provided. The electronic device includes a memory storing instructions; and a processor configured to execute the instructions to: based on a text being input, determine semantic roles of sentence components included in the text by inputting information on the text to a first model trained to determine the semantic roles of the sentence components; obtain a risk level of the text by inputting the sentence components with the determined semantic roles of the sentence components to a second model trained to output the risk level of the text based on the semantic roles of the sentence components; and perform an operation corresponding to the obtained risk level of the text.

11 Claims, 7 Drawing Sheets

(58) Field of Classification Search
USPC .............................................................. 704/9
See application file for complete search history.

(56) References Cited

U.S. PATENT DOCUMENTS

| | | | | |
|---|---|---|---|---|
| 8,095,612 | B2* | 1/2012 | Cowan | G06Q 10/107 |
| | | | | 709/206 |
| 8,769,028 | B2 | 7/2014 | Herold et al. | |
| 9,148,894 | B1* | 9/2015 | Pan | H04W 4/029 |
| 10,015,546 | B1* | 7/2018 | Petty | H04N 21/6543 |
| 10,212,119 | B2* | 2/2019 | Bisarya | H04L 67/306 |
| 10,453,017 | B1* | 10/2019 | Richards | H04L 63/1483 |
| 10,776,580 | B2 | 9/2020 | Kim et al. | |
| 11,645,449 | B1* | 5/2023 | Ritchie | G06Q 30/0282 |
| | | | | 715/230 |
| 11,722,445 | B2* | 8/2023 | Birch | H04L 61/4511 |
| | | | | 726/22 |
| 11,735,021 | B2* | 8/2023 | Pourmohammad | G06N 20/00 |
| | | | | 706/12 |
| 11,790,411 | B1* | 10/2023 | Mann | G06Q 30/016 |
| | | | | 704/9 |
| 2002/0087649 | A1 | 7/2002 | Horvitz | |
| 2008/0021924 | A1* | 1/2008 | Hall | G06F 16/951 |
| 2008/0183459 | A1* | 7/2008 | Simonsen | G06F 40/58 |
| | | | | 704/1 |
| 2011/0125672 | A1* | 5/2011 | Rosenthal | G06Q 40/08 |
| | | | | 705/36 R |
| 2013/0124192 | A1* | 5/2013 | Lindmark | G06F 40/253 |
| | | | | 704/E11.001 |
| 2014/0280638 | A1* | 9/2014 | O'Dell | H04L 51/212 |
| | | | | 709/206 |
| 2016/0028681 | A1* | 1/2016 | Freire | H04L 51/42 |
| | | | | 709/204 |
| 2016/0057599 | A1* | 2/2016 | Lim | H04W 52/223 |
| | | | | 455/404.1 |
| 2016/0171455 | A1* | 6/2016 | Eleid | G06F 3/0484 |
| | | | | 705/305 |
| 2016/0261627 | A1* | 9/2016 | Lin | H04L 63/1441 |
| 2017/0004008 | A1* | 1/2017 | Kamalakantha | |
| | | | | G06Q 10/06314 |
| 2017/0070518 | A1* | 3/2017 | Manadhata | H04L 63/1416 |
| 2017/0289093 | A1* | 10/2017 | Snider | H04L 51/234 |
| 2017/0346824 | A1 | 11/2017 | Mahabir et al. | |
| 2018/0089449 | A1* | 3/2018 | Boudreau | H04L 63/0227 |
| 2018/0270183 | A1* | 9/2018 | Wei | H04L 51/046 |
| 2018/0336507 | A1* | 11/2018 | Torrado | G06N 20/00 |
| 2019/0020762 | A1* | 1/2019 | Rose | H04M 3/537 |
| 2019/0108086 | A1 | 4/2019 | Yu et al. | |
| 2019/0156256 | A1* | 5/2019 | Argyros | G06F 40/30 |
| 2019/0289370 | A1* | 9/2019 | Deshpande | H04N 21/23614 |
| 2020/0004885 | A1* | 1/2020 | Bastide | G06F 16/248 |
| 2020/0021781 | A1* | 1/2020 | Al-Salem | H04N 7/188 |
| 2020/0104957 | A1* | 4/2020 | Guo | G06F 40/30 |
| 2020/0105246 | A1* | 4/2020 | Brake | G10L 15/26 |
| 2020/0126009 | A1* | 4/2020 | Fu | G06F 16/2365 |
| 2020/0186482 | A1* | 6/2020 | Johnson, III | H04L 12/1818 |
| 2020/0226510 | A1* | 7/2020 | Gupta | G06Q 50/18 |
| 2020/0285752 | A1* | 9/2020 | Wyatt | G06F 21/566 |
| 2020/0295960 | A1 | 9/2020 | Hewitt et al. | |
| 2020/0387991 | A1* | 12/2020 | Raffoul | G06Q 10/10 |
| 2021/0024080 | A1* | 1/2021 | Liu | G06V 20/597 |
| 2021/0074298 | A1* | 3/2021 | Coeytaux | H04N 7/147 |
| 2021/0085261 | A1* | 3/2021 | Cheenepalli | G06N 3/042 |
| 2021/0241241 | A1* | 8/2021 | Lokanath | G06Q 20/065 |
| 2021/0256115 | A1* | 8/2021 | Shashanka | G06F 40/284 |
| 2021/0256436 | A1* | 8/2021 | Nag | G06F 40/30 |
| 2021/0289268 | A1* | 9/2021 | Ng | H04N 21/8358 |
| 2021/0295427 | A1* | 9/2021 | Shiu | G06N 5/04 |
| 2021/0320928 | A1* | 10/2021 | Stuck | H04L 63/1441 |
| 2021/0326881 | A1* | 10/2021 | Handelman | G06N 3/08 |
| 2021/0334462 | A1* | 10/2021 | Kukreja | G06F 40/295 |
| 2021/0350227 | A1* | 11/2021 | Thanabalan | G06N 3/08 |
| 2022/0007075 | A1* | 1/2022 | Richter | H04N 21/4542 |
| 2022/0050900 | A1* | 2/2022 | Wang | G06F 21/568 |
| 2022/0075828 | A1* | 3/2022 | Xie | G06F 16/9038 |
| 2022/0083933 | A1* | 3/2022 | Nag | G06F 40/284 |
| 2022/0164471 | A1* | 5/2022 | Braghin | G06F 16/213 |
| 2022/0210098 | A1* | 6/2022 | Zhang | H04L 51/02 |
| 2022/0245345 | A1* | 8/2022 | Jain | G06F 40/30 |
| 2022/0408215 | A1* | 12/2022 | Chong | G16H 50/80 |
| 2023/0012527 | A1* | 1/2023 | Iguchi | G16H 50/70 |
| 2023/0214602 | A1* | 7/2023 | Hinrichs | G06F 16/353 |
| | | | | 704/9 |

FOREIGN PATENT DOCUMENTS

| | | |
|---|---|---|
| KR | 10-1441469 B1 | 9/2014 |
| KR | 10-2017-0010978 A | 2/2017 |
| KR | 10-2019-0046472 A | 5/2019 |
| KR | 10-2019-0131341 A | 11/2019 |
| KR | 10-2020-0039407 A | 4/2020 |
| KR | 10-2143181 B1 | 8/2020 |

OTHER PUBLICATIONS

International Written Opinion dated May 31, 2022 issued by the International Searching Authority in counterpart International Application No. PCT/KR2022/002315 (PCT/ISA/237).

* cited by examiner

ELECTRONIC DEVICE AND METHOD FOR CONTROLLING THEREOF

CROSS-REFERENCE TO RELATED APPLICATION(S)

This application is a continuation application, claiming priority under 35 U.S.C. § 365(c), of International Application No. PCT/KR2022/002315, filed on Feb. 17, 2022, which is based on and claims the benefit of a Korean Patent Application No. 10-2021-0021116, filed on Feb. 17, 2021, and Korean Patent Application No. 10-2022-0006094, filed on Jan. 14, 2022, in the Korean Intellectual Property Office, the disclosures of which are incorporated by reference herein in their entireties.

BACKGROUND

1. Field

The disclosure relates to an electronic device and a control method thereof, and more particularly, to an electronic device performing an operation corresponding to a risk level of an input text and a control method thereof.

2. Description of Related Art

In recent years, an artificial intelligence system is used in various fields. The artificial intelligence system may refer to, for example, a system in which a machine learns, determines, and becomes smarter by itself, unlike a rule-based smart system of the related art. As the artificial intelligence system is used, a recognition rate is improved and preferences of a user can be more accurately understood, and thus, the rule-based smart system of the related art is gradually being replaced with the deep learning-based artificial intelligence system.

A chatbot using a deep learning-based artificial intelligence system has been developed and widely used. For example, a customer service chatbot providing a response to an inquiry based on an input of an inquiry regarding a defect or state of a device has been widely used.

The customer service chatbot using a technology of the related art may recognize or detect words included in the input inquiry to assess a degree of risk of a situation implied by the inquiry. A degree of risk implied by the words included in the inquiry may be different according to various contexts. However, the customer service chatbot using the technology of the related art has a limit that it may not able to clearly distinguish the difference of degrees of risk implied by the words according to the contexts.

The disclosure is made in view of the above problem and an object of the disclosure is to provide an electronic device determining a semantic role of a sentence component included in a text and obtaining a risk level of the text using the sentence component corresponding to the determined semantic role to perform a control operation of a target device suitable to the risk level and a control method thereof.

SUMMARY

According to an aspect of the disclosure, there is provided an electronic device including: a memory storing instructions; and a processor configured to execute the instructions to: based on a text being input, determine semantic roles of sentence components included in the text by inputting information on the text to a first model trained to determine the semantic roles of the sentence components; obtain a risk level of the text by inputting the sentence components with the determined semantic roles of the sentence components to a second model trained to output the risk level of the text based on the semantic roles of the sentence components; and perform an operation corresponding to the obtained risk level of the text.

The first model may be trained to determine each of the sentence components of the text as one of an agent, a recipient, and a predicate.

The second model may be trained to, based on a sentence component determined as at least one of the agent and the recipient being a user or a device, increase the risk level of the text.

The second model may be trained to identify a word having similar meaning as a sentence component determined as one of the agent, the recipient, and the predicate, and output the risk level of the text by using a weight value matching to the identified word.

The second model may be trained to output one of a plurality of grades corresponding to a degree of risk as the risk level of the text.

The second model may be trained to output the risk level of the text as a value representing a degree of risk.

The operation corresponding to the risk level may include at least one of performing a power-off of a target device, blocking network connection of the target device, re-starting of the target device, or turning off a background application which is running at the target device, and the target device may be at least one of the electronic device or another electronic device.

The electronic device may further include a communicator including circuitry, wherein the processor may be further configured to execute the instructions to, based on the risk level of the text being equal to or higher than a threshold grade or a threshold value: control the communicator to transmit the text and the operation corresponding to the risk level to a server managing the device, or provide an alert message regarding a situation corresponding to the text and the operation corresponding to the risk level.

The processor may be further configured to execute the instructions to, based on the risk level of the text being equal to or higher than a second threshold grade or a second threshold value, perform a power-off operation of the target device.

The processor may be further configured to execute the instructions to obtain the information on the text including a result of sentence parsing the text by inputting the text to a sentence parsing model trained to perform the sentence parsing.

The electronic device may further include: a microphone, wherein the processor may be further configured to execute the instructions to, based on a user voice input inquiring for a state of the electronic device or another device being received via the microphone, obtain a text corresponding to the user voice input by inputting the user voice input to an auto speech recognition (ASR) model.

According to an aspect of the disclosure, there is provided a method for controlling an electronic device, the method including: receiving an input of a text; determining semantic roles of sentence components included in the text by inputting information on the text to a first model trained to determine the semantic roles of the sentence components; obtaining a risk level of the text by inputting the sentence components with the determined semantic roles to a second model trained to output the risk level based on the semantic roles of the sentence components; and performing an operation corresponding to the obtained risk level of the text.

The first model may be trained to determine each of the sentence components of the text as one of an agent, a recipient, and a predicate.

The second model may be trained to, based on a sentence component determined as at least one of the agent and the recipient being a user or a device, increase the risk level of the text.

The second model may be trained to identify a word having similar meaning as a sentence component determined as one of the agent, the recipient, and the predicate, and output the risk level of the text by using a weight value matching to the identified word.

According to various aspects described above, the electronic device may assess a degree of risk of a situation implied by an input text more accurately and respond thereto rapidly.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Embodiments of the disclosure will be described in detail below.

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, based on there being no specific term definitions.

The same reference numerals or symbols in the accompanying drawings in this specification denote parts or components executing substantially the same function. For convenience of description and understanding, the description will be made using the same reference numerals or symbols in different embodiments. That is, although the components with the same reference numerals are illustrated in the plurality of drawings, the plurality of drawings are not illustrating one embodiment.

Various elements and areas in the drawings are schematically illustrated. Therefore, the technical spirit of the disclosure is not limited by comparative sizes or intervals illustrated in the accompanying drawings.

In addition, terms including ordinals such as "first" or "second" may be used for distinguishing components in the specification and claims. Such ordinals are used for distinguishing the same or similar components and the terms should not be limitedly interpreted due to the use of ordinals. For example, in regard to components with such ordinals, usage order or arrangement order should not be limitedly interpreted with the numbers thereof. The ordinals may be interchanged, if necessary.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware.

Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor.

Based on description that a certain element (e.g., first element) is "operatively or communicatively coupled with/ to" or is "connected to" another element (e.g., second element), it should be understood that the certain element may be connected to the other element directly or through still another element (e.g., third element). On the other hand, based on description that a certain element (e.g., first element) is "directly coupled to" or "directly connected to" another element (e.g., second element), it may be understood that there is no element (e.g., third element) between the certain element and the another element.

An electronic device 100 may include at least one of, for example, a smartphone, a tablet personal computer (PC), a desktop PC, a laptop PC, a netbook computer, a workstation, a medical device, a camera, or a wearable device. However, the electronic device is not limited thereto, and the electronic device 100 may also be implemented as various types of devices such as a display device, a refrigerator, an air conditioner, a vacuum cleaner, and the like.

In this disclosure, a term "user" may refer to a person using an electronic device or a device using an electronic device (e.g., an artificial intelligence electronic device).

Hereinafter, embodiments of the disclosure will be described in detail with reference to the drawings.

Figure 1:
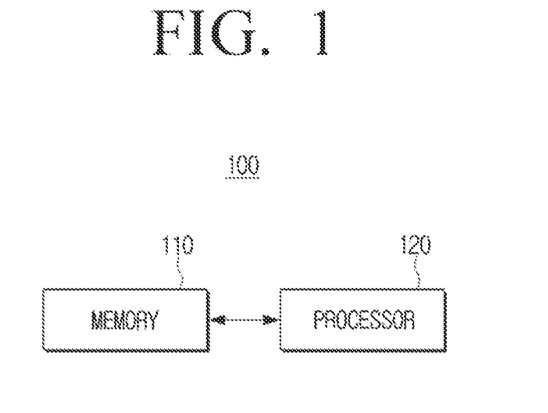
FIG. 1 is a block diagram schematically illustrating a configuration of an electronic device according to an embodiment.

FIG. 1 is a block diagram schematically illustrating a configuration of the electronic device 100 according to an embodiment. Referring to FIG. 1, the electronic device 100 may include a memory 110 and a processor 120. However, the configuration illustrated in FIG. 1 is merely an example diagram for implementing embodiments of the disclosure, and suitable hardware and software configurations apparent to those skilled in the art may be additionally included in the electronic device 100.

The memory 110 may store data or at least one instruction related to at least another constituent element of the electronic device 100. The instruction may refer to an action statement that may be executed directly by the processor 120 in a programming language and may be a minimum unit of a program execution or action. The memory 110 may be accessed by the processor 120 and reading, recording, editing, deleting, or updating of the data by the processor 120 may be executed.

A term, memory, in the disclosure may include the memory 110, a read-only memory (ROM) and/or a random access memory (RAM) in the processor 120, or a memory separated from the processor 120. In such a case, the memory 110 may be implemented in a form of a memory embedded in the electronic device 100 or implemented in a form of a memory detachable from the electronic device 100 according to data storage purpose. For example, data for operating the electronic device 100 may be stored in a memory embedded in the electronic device 100, and data for an extended function of the electronic device 100 may be stored in a memory detachable from the electronic device 100.

The memory 110 may store data necessary for at least one of a first model, a second model, an auto speech recognition (ASR) model, and a sentence parsing model to perform various operations. Each model will be described below.

The processor 120 may be electrically connected to the memory 110 to control various operations and functions of the electronic device 100. The processor 120 may include one or more processors. The one or more processors may be a general-purpose processor such as a central processing unit (CPU), an application processor (AP), or a digital signal processor (DSP), a graphic dedicated processor such as a graphic processing unit (GPU) or a vision processing unit (VPU), or an artificial intelligence dedicated processor such as a neural processing unit (NPU), or the like. Based on the one or the plurality of processors being artificial intelligence dedicated processors, the artificial intelligence dedicated processor may be designed to have a hardware structure specialized in processing of a specific artificial intelligence model.

In addition, the processor 120 may be implemented as System on Chip (SoC) or large scale integration (LSI) including the processing algorithm or may be implemented in form of a field programmable gate array (FPGA). The processor 120 may perform various functions by executing computer executable instructions stored in the memory.

The processor 120 may receive an input of a text from a user. The text input to the processor 120 may include a text for inquiring a state or a defect of the electronic device 100 or another device.

In an embodiment, the processor 120 may receive an input of a text from the user via a virtual keyboard UI or the like displayed on a touch screen.

In another embodiment, based on a voice for inquiring a state or a defect of the electronic device 100 or another device being input via a microphone 160, the processor 120 may obtain a text corresponding to the voice by inputting the input voice to the ASR model. The ASR model (or speech-to-text (STT) model) herein may refer to an artificial intelligence model trained to recognize an input voice and output a text corresponding to the recognized voice.

The processor 120 may input information on the input text to the first model to label (determine) semantic roles of sentence components included in the text. The information on the text may include a sentence parsing result of the text. The processor 120 may obtain the sentence parsing result by inputting the text to the sentence parsing model trained to perform the sentence parsing operation. Here, the syntax analysis may be performed based on general knowledge, and the general knowledge may be made of at least one of a synonym, a narrower term, and a broader term included in a dictionary. The processor 120 may obtain a more accurate syntax analysis result by inputting a synonym, a narrower term, and a broader term together with text in a syntax analysis model trained to perform a syntax analysis operation.

The first model may refer to an artificial intelligence model trained to label semantic roles of sentence components included in a sentence. The semantic roles may refer to semantic roles of a verb or noun phrase described by a predicate in the sentence and may include, for example, an agent, a recipient, and a predicate. In other words, the first model may be trained to, based on information on a text being input, label each of sentence components of the text as one of an agent, a recipient, and a predicate. The configuration and the operation of the first model will be described in detail with reference to FIGS. 3 and 4.

The processor 120 may obtain a risk level of the text by inputting the sentence components corresponding to the semantic roles labeled (determined) by the first model to the second model. The second model herein may refer to an artificial intelligence model trained to output a risk level based on semantic roles of sentence components included in a sentence.

The risk level of the text may refer to a value or a grade representing a degree of risk or a degree of urgency implied by a situation indicated by a text. A high value corresponding to the risk level of the text or a high grade corresponding to the risk level of the text may imply that the degree of risk or the degree of urgency implied by the situation indicated by the text is high.

In other words, the second model may be trained to determine one of a plurality of risk grades classified according to the degree of risk or the degree of urgency as the risk level of the text. In another example, the second model may be trained to output the risk level of the text as a value representing the degree of risk.

In an embodiment, based on the text for inquiring the state or the defect of the electronic device 100 or another device including a sentence component implying a user (or person) or a specific device, the degree of risk or the degree of urgency of the situation implied by the corresponding text is likely to be high. Accordingly, based on a sentence component labeled as at least one of the agent and the recipient implying the user or the specific device, the second model may increase the risk level of the text by a predetermined value or by a predetermined grade.

In another embodiment, the second model may be trained to identify a word having similar meaning as the sentence component labeled as one of the agent, the recipient, and the predicate, and output the risk level of the text by using a weight value matching to the identified word. Specifically, the second model may be trained to identify a similar word as the sentence component using a language database such as a dictionary (e.g., thesaurus) in a training step.

For example, it is assumed that the text input to the electronic device 100 includes a specific word which is not trained by the second model. The second model may identify a word having similar meaning as the specific word and output a risk level of the text using a weight value matching to the identified word. In other words, although some words are not trained, the second model may infer the meaning of the word, which is not trained, by using the pre-trained language database.

The processor 120 may determine whether the risk level of the text is equal to or higher than a threshold grade or equal to or higher than a threshold value. The risk level of the text that is equal to or higher than a threshold grade or equal to or higher than a threshold value may imply that the degree of risk or the degree of urgency of the situation implied by the text is extremely high.

The threshold grade may refer to a grade set by the user among the plurality of risk grades classified according to the degree of risk and may be changed. For example, it is assumed that the plurality of risk grades are classified into Extreme, High, Mid, Low, and None in the order of the degree of risk. The threshold grade may be determined as High by the user or may be changed to Extreme or Mid.

The threshold value may refer to a value predetermined by experiments or research and may be changed by the user.

The processor 120 may perform an operation corresponding to the risk level of the text. An operation corresponding to the risk level may be at least one of performing a power-off of a target device, blocking network connection of the target device, re-starting of the target device, or a turning off a background application which is being running at the target device. Here, the target device may be at least one of the electronic device 100 or another electronic device.

Based on the risk level of the text being higher than or equal to the first threshold level or is equal to or higher than the first threshold level, the processor 120 may control a communicator to transmit an operation corresponding to the text and the risk level to a server managing the apparatus corresponding to the text or provide an alert message of an operation corresponding to a situation and a risk level corresponding to the text. Here, based on the risk level of the text being lower the first threshold level or less than the first threshold value, the processor 120 may provide only the alert about the urgent situation to the user without performing a separate additional control operation.

The higher the level of the risk level, and the greater the value of the risk level, the processor 120 may control the target device to perform a minimum function. Specifically, the processor 120 may perform an operation for overall system recovery, such as terminating the power of the target device or restarting the target device. For example, the processor 120 may perform a power termination operation of the target device based on the risk level of the text being higher than or equal to a second threshold level, which is a grade higher than the first threshold level, or greater than a second threshold value, which is a value greater than the first threshold value.

In another embodiment, the target device control operation corresponding to the dangerous situation may be performed by identifying information on the dangerous situation of the user query.

Specifically, based on the internal temperature of the target device being greater than or equal to the first threshold temperature, the processor 120 may terminate all the background applications of the target device. Based on the internal temperature of the target device being higher than or equal to the second threshold temperature higher than the first threshold temperature, the processor 120 may control the target device to restart the target device. Based on the internal temperature of the target device being greater than or equal to a third threshold temperature higher than the second threshold temperature, the processor 120 may terminate the power of the target device.

Based on the volume of the target device being identified to expand more than a predetermined volume, the processor 120 may terminate the power of the target device.

The device corresponding to the text may refer to a device indicated by the sentence component labeled as the agent or the recipient. In other words, based on the risk level of the text being identified to be equal to or higher than the threshold grade or the threshold value, the processor 120 may perform an operation corresponding to a dangerous situation or an urgent situation implied by the text.

For example, it is assumed that the processor 120 receives a text having a meaning that a smartphone battery is inflated (swollen) and assesses that the risk level of the text is equal to or higher than the risk grade. The processor 120 may control the communicator to transmit the text to the server managing the smartphone. Accordingly, a server manager may handle urgently the situation occurred on the smartphone.

The processor 120 may provide an alert message regarding the situation corresponding to the text. For example, the processor 120 may control a display to display a user interface (UI) including pre-stored manual information related to the battery of the smartphone or how to handle the battery of the smartphone. In another example, the processor 120 may control the display to display information (e.g., instructions based on battery being inflated, and the like) provided from the server managing the smartphone.

In still another example, the processor 120 may control a speaker to output an urgent alert sound or message notifying that the situation corresponding to the text is an urgent situation. In still another example, the processor 120 may control the speaker to output the information provided from the server managing the smartphone as a voice. In still another example, the processor 120 may call a pre-registered number of a manager of the server managing the smartphone. However, embodiments are not limited thereto, and the operation corresponding to the risk level of the text may be implemented in various manners.

Through the embodiment described above, the electronic device 100 may rapidly respond to the urgent situation of various devices by obtaining the risk level of the input text, and the user may receive information for handling the urgent situation.

Based on the risk level of the text being identified to be lower than the threshold grade or the threshold value, the processor 120 may store a log file showing that the text is input in the memory 110.

The function related to artificial intelligence according to the disclosure is performed through the processor 120 and the memory 110. The one or more processors 120 may perform control to process the input data according to a predefined action rule stored in the memory 110 or an artificial intelligence model.

The predefined action rule or the artificial intelligence model is formed through training. The forming through training herein may, for example, imply that a predefined action rule or an artificial intelligence model set to perform a desired feature (or object) is formed by training a basic artificial intelligence model using a plurality of pieces of learning data by a learning algorithm. Such training may be performed in a device demonstrating artificial intelligence according to the disclosure or performed by a separate server and/or system.

Examples of the learning algorithm include supervised learning, unsupervised learning, semi-supervised learning, or reinforcement learning, but the learning algorithm is not limited to these examples.

The artificial intelligence model may include a plurality of artificial neural networks and the artificial neural network may be formed of a plurality of layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process.

The artificial neural network may include a deep neural network (DNN), and, for example, include a convolutional neural network (CNN), a deep neural network (DNN), recurrent neural network (RNN), a restricted Boltzmann machine (RBM), aa deep belief network (DBN), bidirectional recurrent deep neural network (BRDNN), or a deep Q-network, but embodiments are not limited to these examples.

Figure 2:
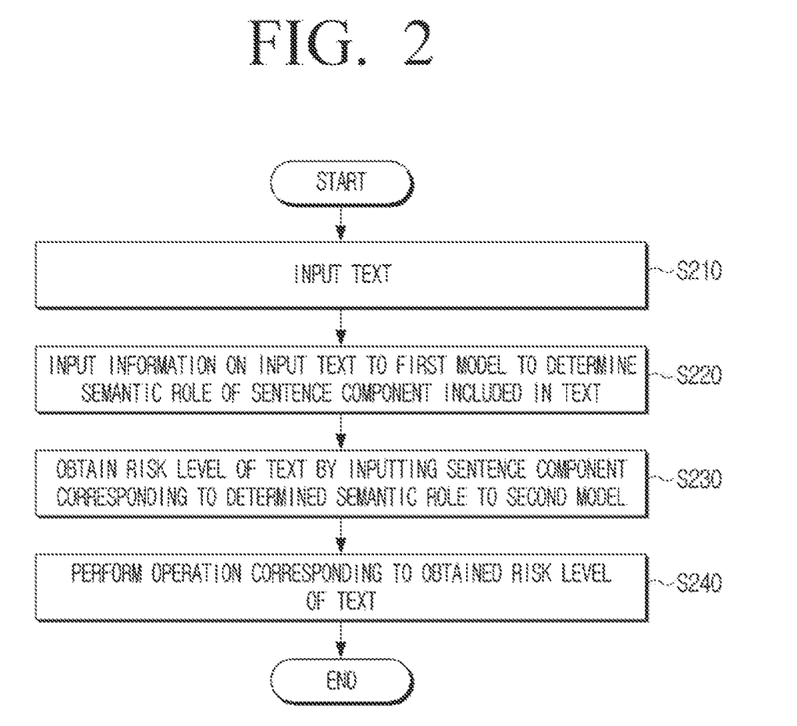
FIG. 2 is a flowchart illustrating a method for controlling an electronic device according to an embodiment.

FIG. 2 is a flowchart illustrating a method for controlling the electronic device 100 according to an embodiment.

The electronic device 100 may receive an input of a text (S210). In an embodiment, the electronic device 100 may receive an input of a text containing a content for inquiring a state or a defect of the electronic device 100 or another device from the user.

In another embodiment, the electronic device 100 may receive an input of a user's voice for inquiring about a state or a defect of the electronic device 100 or another device. The electronic device 100 may input the input user's voice to the ASR model to obtain a text corresponding to the user's voice.

The electronic device 100 may input information on the input text to the first model to label a semantic role of a sentence component included in the text (S220). The first model may refer to an artificial intelligence model trained to label a semantic role of a sentence component included in a sentence.

Specifically, the electronic device 100 may input the input text to the sentence parsing model to obtain information on the text including the sentence parsing result. The electronic device 100 may input the information on the text to the first model to label each of the sentence components included in the text as one of the agent, the recipient, and the predicate.

The electronic device 100 may obtain a risk level of the text by inputting the sentence component corresponding to the labeled semantic role to the second model (S230).

The second model may refer to an artificial intelligence model trained to output a risk level based on a semantic role of a sentence component included in a sentence. The second model may output one of a plurality of risk grades classified according to the degree of risk as the risk level of the text. In another example, the second model may be trained to output the risk level of the text as a value representing the degree of risk.

The electronic device 100 may then perform an operation corresponding to an obtained risk level of the text (operation S240). The operation corresponding to the risk level may be at least one of performing a power-off of a target device, blocking network connection of the target device, re-starting of the target device, or turning off a background application which is running at the target device. Here, the target device may be at least one of the electronic device 100 or another electronic device.

The electronic device 100 may identify whether the obtained risk level of the text is higher than or equal to the first threshold level or the second threshold value. Based on the identification that the risk level of the text is higher than or equal to the threshold grade or the threshold value, the electronic device 100 may transmit the text and an operation corresponding to the risk level to a server managing a device corresponding to the text or provide an alert message regarding a situation corresponding to the text and the operation corresponding to the risk level. Based on the risk level of the text being equal to or higher than the second threshold grade or equal to or higher than the second threshold value, the electronic device 100 may perform a power-off operation of the target device.

The device corresponding to the text may refer to a device indicated by one sentence component of the text labeled as the agent or the recipient. The alert message regarding the situation corresponding to the text may include a message for handling the situation corresponding to the text or an alert sound for notifying the situation corresponding to the text which are pre-stored in the electronic device 100. In another example, the alert message of the situation corresponding to the text may include information received from the server managing the device corresponding to the text.

Based on the risk level of the text being identified to be lower than the threshold grade or the threshold value, the electronic device 100 may store a log file showing that the text is input.

Figure 3:
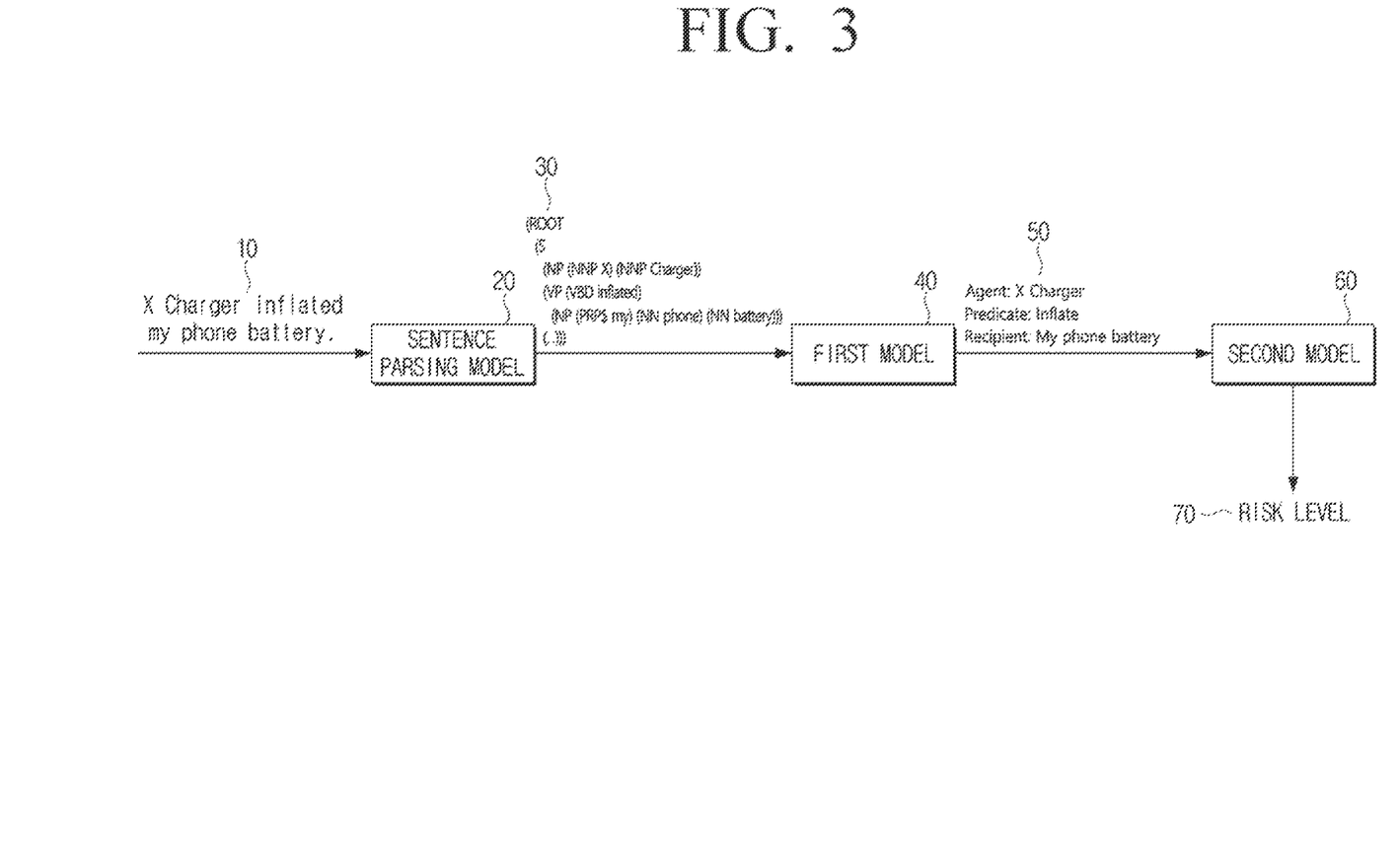
FIG. 3 is a diagram illustrating a process in which the electronic device outputs a risk level of a text according to an embodiment.

FIG. 3 is a diagram illustrating a process in which the electronic device 100 obtains a risk level of a text using each model according to an embodiment. Referring to FIG. 3, a sentence parsing model 20, a first model 40, and a second model 60 may be connected to each other in a pipeline structure.

However, this is merely an example and each of the models 20, 40, and 60 may be implemented as a constituent element of a risk level assessment model that is one artificial intelligence model. The risk level assessment model may be a model trained to output a risk level 70 of the text using an input text 10 and may be implemented as an end-to-end structure.

Each of the models 20, 40, and 60 may be embedded in the electronic device 100 or at least one of the models 20, 40, and 60 may be included in the server.

The electronic device 100 may input the text 10 to the sentence parsing model 20 to obtain information on the text 10 including a sentence parsing result 30. For example, it is assumed that the text 10 ("X Charger inflated my phone battery") is a text inquiring the situation where a charger manufactured by X inflates a battery. The sentence parsing result may be output as in Table 1 below.

TABLE 1

ROOT
(S
  (NP (NNP X) (NNP Charger))
  (VP (VBD inflated)
    (NP (PRP$ my) (NN phone) (NN battery)))
  (. .)))

The electronic device 100 may input the information on the text including the sentence parsing result 30 to the first model 40 to label semantic roles of sentence components included in the text. For example, "X charger" may be labeled as the agent, "inflated" may be labeled as the predicate, and "my phone battery" may be labeled as the recipient. The electronic device 100 may input the sentence components 50 corresponding to the labeled semantic roles to the second model 60 to output the risk level 70 of the text. The second model 60 may output the risk level 70 representing whether the situation where "X charger" performs the action "inflated" with respect to the target "my phone battery" is the dangerous or urgent situation. The individual meaning of each of the words ("X charger", "my phone battery", and "inflated") included in the text 10 may not indicate the dangerous or urgent situation. However, the combination of the words may derive the meaning of the situation where the charger inflates the battery. The situation with the derived meaning may be a dangerous or urgent situation with high possibility. In a case of assessing the degree of risk of the text 10 by detecting the degree of risk of each word, the situation implied by the text may be erroneously determined as not being the dangerous situation with high possibility.

Accordingly, since the second model outputs the risk level of the text by using the sentence components of the text corresponding to the labeled semantic roles, it is possible to more accurately indicate the degree of risk or degree of urgency of the situation implied by the text.

The second model may increase the risk level of the text, based on the agent or the recipient being a user or a device. For example, "X charger" and "my phone battery", which are sentence components labeled as the agent and the recipient, refer to specific devices, and accordingly, the second model may increase the risk level of the text by a predetermined grade or value.

The electronic device 100 may perform the operation corresponding to the risk level 70 of the text. The operation corresponding to the risk level has been described above, and therefore the overlapped description thereof will not be repeated.

Figure 4:
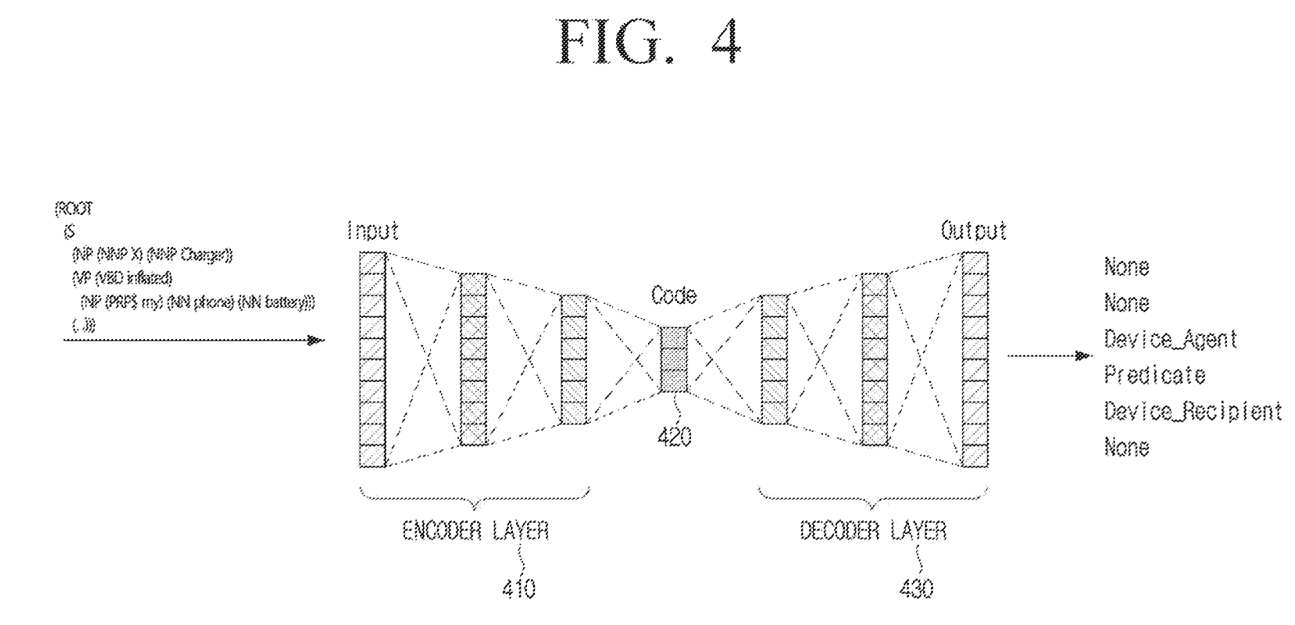
FIG. 4 is a diagram illustrating a configuration and an operation of a first model according to an embodiment.

FIG. 4 is a diagram illustrating a configuration and an operation of a first model according to an embodiment.

Referring to FIG. 4, the first model may include an encoder layer 410 and a decoder layer 430. The encoder layer 410 may output code information (output data) 420 by extracting data necessary to label sematic roles of sentence components included in the text from the sentence parsing result (input data). In other words, the code information 420 may refer to information obtained by compressing information to label sematic roles of sentence components included in the text.

The decoder layer 430 may output data (output data) for labeling the semantic roles of the sentence components included in the text by using the code information 420.

Referring to FIG. 4, the data for labeling the semantic roles of the sentence components output from the decoder layer 430 and the sentence parsing result may match to each other one on one. For example, a third line ((NP (NNP X) (NNP Charger))) of the sentence parsing result may match to a third component (Device_Agent) of the output data for labeling the semantic role of the sentence component one on one. Accordingly, "X charger" among the sentence components of the text may be labeled as the agent among the semantic roles.

Figure 5:
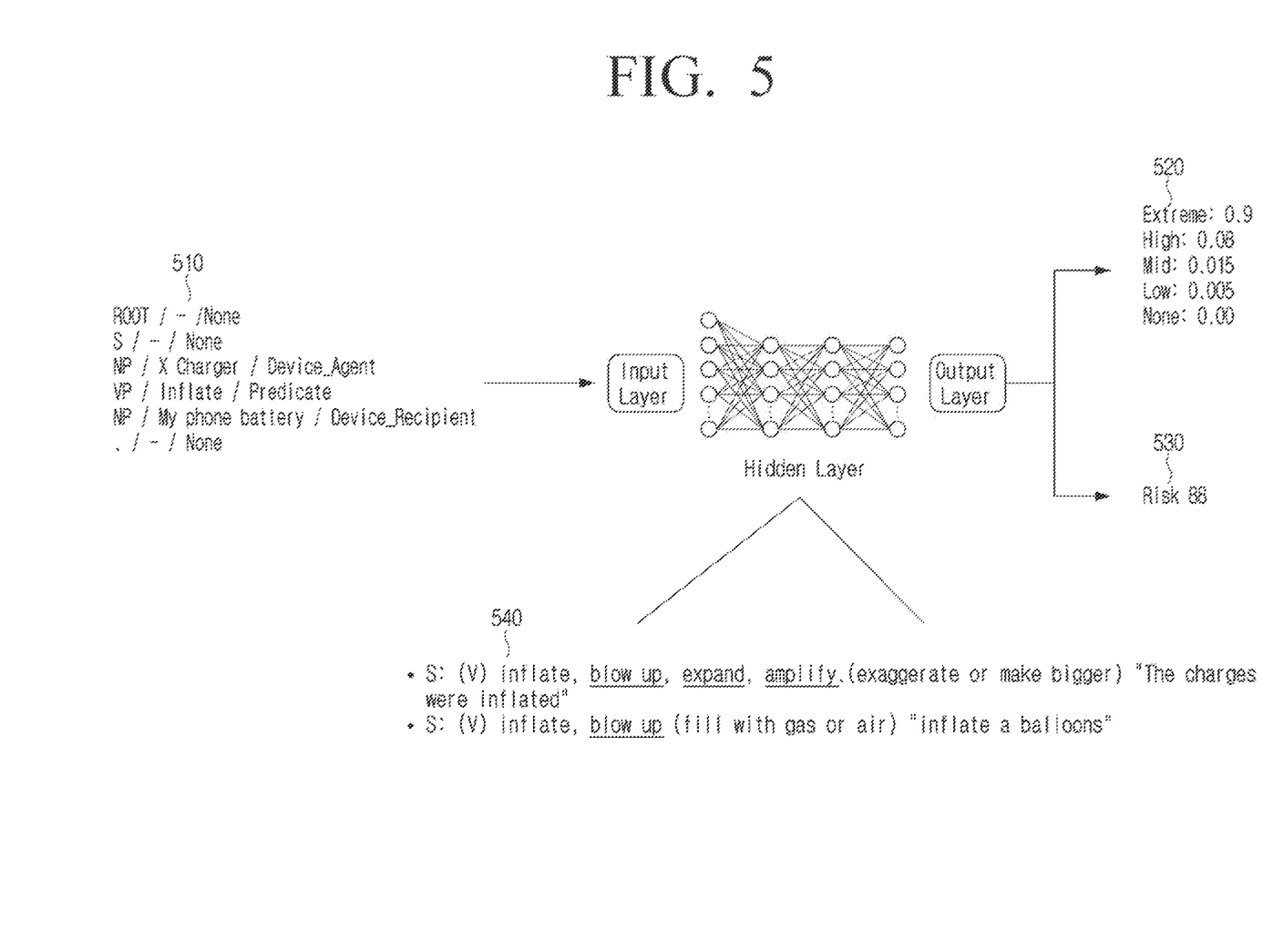
FIG. 5 is a diagram illustrating a configuration and an operation of a second model according to an embodiment.

FIG. 5 is a diagram illustrating a configuration and an operation of a second model according to an embodiment.

In an embodiment, based on the sentence components corresponding to the semantic roles labeled by the first model being input, the second model may output the risk level of the text. For example, based on the sentence components corresponding to the labeled semantic roles (Agent: X Charger, Predicate: Inflate, Recipient: My phone battery) being input, the second model may output the risk level of the text.

In another embodiment, based on combined data 510 of the sentence components corresponding to the semantic roles labeled by the first model and the sentence parsing result being input, the second model may output the risk level of the text. In other words, the electronic device 100 may combine the sentence parsing result 30 and the sentence components 50 corresponding to the labeled semantic roles illustrated in FIG. 3, and input the combined data 510 to the second model to obtain the risk level of the text. The combined data 510 may be implemented as in Table 2 below.

TABLE 2

ROOT / - /None
S / - / None
NP / X Charger / Device_Agent
VP / Inflate / Predicate
NP / My phone battery / Device_Recipient
. / - / None The second model may be trained to identify a word having similar meaning as the sentence component labeled as one of the agent, the recipient, and the predicate, and output the risk level of the text using a weight value matching to the identified word. Specifically, the second model may be trained to identify the word similar to the sentence component by using a language database 540 configured with a dictionary (e.g., thesaurus) including synonyms and the like. For example, it is assumed that the second model is not trained using learning data including a word "inflate". The second model may identify a word (e.g., blow up) having similar meaning as the sentence component "inflate" labeled as the predicate by using the language database 540. The second model may output the risk level of the text by using the weight value matching to the identified "blow up". In other words, the second model may output the risk level of the text by using the weight value corresponding to the sentence component labeled as the agent and the recipient and the weight value matching to "blow up". According to the embodiment described above, the second model may identify the meaning of the word not trained in the training step by using the database including synonyms and the like such as a dictionary. Therefore, it is possible to reduce an amount of data for training the second model, and training time and cost.

In an embodiment, the second model may classify (or determine) the risk level of the text as one of the plurality of risk grades by using a classification method. An output layer of the second model may include a softmax layer. The softmax layer may refer to a layer that performs a function of a softmax function that sets a sum of probabilities of correct answers with respect to all possible results as 1 as a predicted value of the input data.

For example, it is assumed that the risk level is classified into five risk grades (Extreme, High, Mid, Low, and None) according to the degree of risk. Based on the combined data 510 being input, the second model may output probabilities 520 that each of the five risk grades is a grade corresponding to the risk level of the text, by using the softmax layer. The probability that the risk level of the text is Extreme among the plurality of risk grades is highest as 90%, and accordingly, the electronic device 100 may identify the risk level of the text as Extreme.

In another embodiment of the disclosure, the second model may output the risk level of the text as a value 530 representing the degree of risk by using a regression method. A higher value representing the degree of risk may imply that the degree of risk or the degree of urgency of the situation implied by the text is high.

The electronic device 100 may identify whether the risk level of the text output by the second model is equal to or higher than the threshold grade or the threshold value to identify the degree or risk or the degree of urgency of the situation implied by the text. Based on the risk level of the text being equal to or higher than the threshold grade or the threshold value, the electronic device 100 may transmit the text to the server managing the device corresponding to the text or provide the alert message regarding the situation corresponding to the text.

Figure 6:
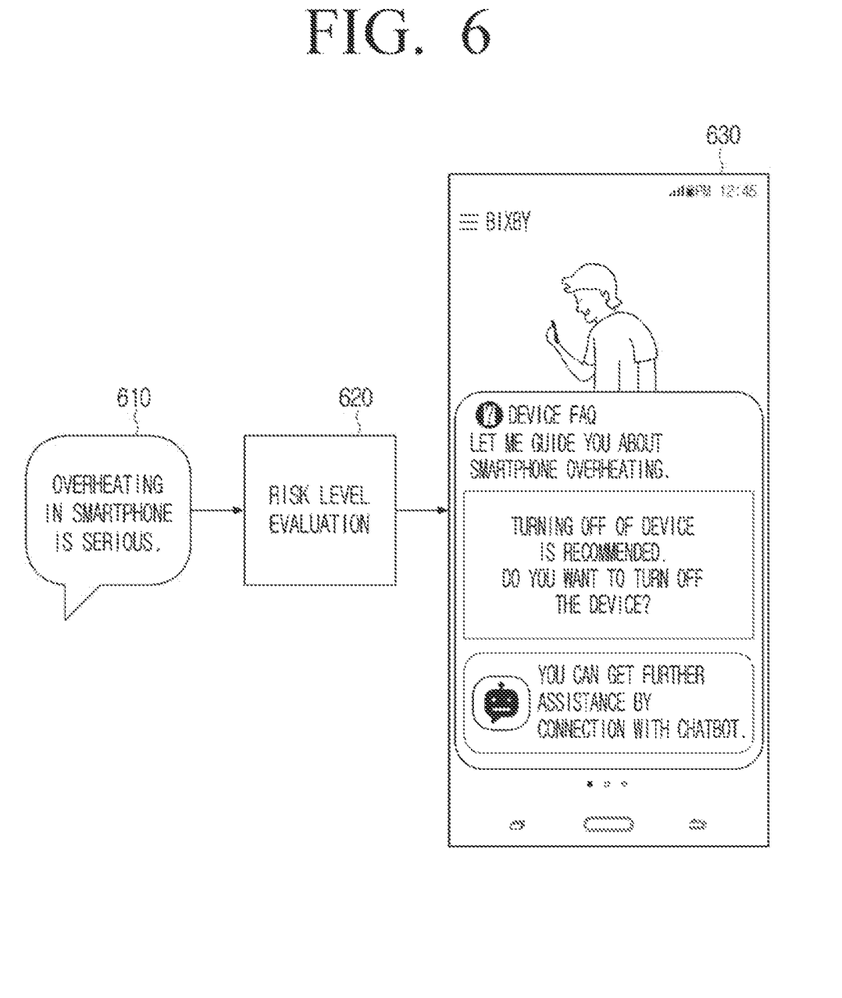
FIG. 6 is a diagram illustrating a control operation of a target device according to an embodiment.

FIG. 6 is a diagram illustrating a control operation of a target device according to an embodiment. Based on a user query 610 (e.g., overheating in a smartphone is serious) being input in a voice or text format, the processor 120 may obtain information 620 for the risk level of the user query 610. Based on the obtained risk level being higher than or equal to the first threshold value or the first threshold value, the processor 120 may perform a control operation of the target device corresponding to the risk level. In addition, based on the obtained risk level being a second threshold grade, which is a grade higher than the first threshold level or the obtained risk level is a second threshold value, which is a value greater than the first threshold value, the processor 120 may control a display to display a UI 630 for performing an operation (e.g., a power blocking operation) corresponding to a dangerous situation (e.g., a mobile phone overheating) and a risk level.

Figure 7:
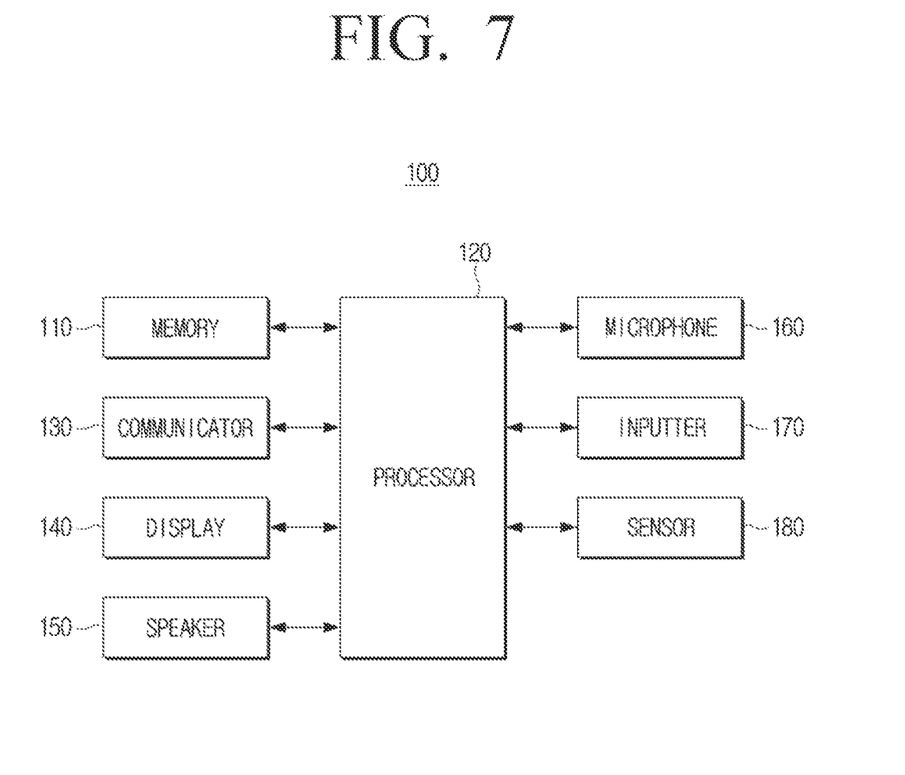
FIG. 7 is a block diagram illustrating a configuration of the electronic device according to an embodiment.

FIG. 7 is a block diagram illustrating a configuration of the electronic device 100 according to an embodiment. Referring to FIG. 6, the electronic device 100 may include the memory 110, the processor 120, a communicator 130, a display 140, a speaker 150, a microphone 160, an inputter 170, and a sensor 180. The memory 110 and the processor 120 have been described in detail with reference to FIG. 1, and therefore the repeated description thereof will be omitted.

The communicator 130 may be a communication interface configured to communicate with an external device. The communication connection of the communicator 130 with the external device may include communication via a third device (e.g., a repeater, a hub, an access point, a gateway, or the like).

The communicator 130 may receive a user's voice input via the microphone 160 connected to the electronic device 100 wirelessly. The communicator 130 may transmit the text to the server (or device of the server manager) managing the device corresponding to the text input to the electronic device 100. The communicator 130 may receive information for handling the situation corresponding to the text from the server.

The communicator 130 may include one or more communication modules for communicating with the external device. In an example, the communicator 130 may include one or more wireless communication modules and, for example, include a cellular communication module using at least one of LTE, LTE Advanced (LTE-A), code division multiple access (CDMA), wideband CDMA (WCDMA), universal mobile telecommunications system (UMTS), Wireless Broadband (WiBro), or global system for mobile communications (GSM), and $5^{th}$ generation (5G).

In another example, the one or more wireless communication modules may, for example, include at least one of wireless fidelity (Wi-Fi), Bluetooth, Bluetooth Low Energy (BLE), and Zigbee.

The display 140 may display various information according to the control of the processor 120. In particular, the display 140 may display the text input by the user (or text corresponding to the user's voice). The display 140 may display a UI including the information for handling the situation corresponding to the text. In another example, the display 140 may display an indicator or message indicating that the situation corresponding to the text is dangerous or urgent.

The display 140 may be implemented as a touch screen with a touch panel and may also be implemented as a flexible display.

The speaker 150 may output not only various audio data obtained by executing various processing such as decoding, amplification, or noise filtering by an audio processor, but also various alerts or voice messages. The speaker 150 may output the information for handling the situation corresponding to the text and the like as a voice. In another example, the speaker 150 may output the alert sound indicating that the situation corresponding to the text is dangerous or urgent.

A constituent element for outputting audio may be implemented as the speaker 150, but this is merely an example, and the constituent element may be implemented as an output terminal that may output the audio data.

The microphone 160 may receive an input of a user's voice. The microphone 160 may receive a trigger voice (or wake-up voice) requesting for start of recognition of the ASR model and receive a user inquiry for requesting for specific information (e.g., the information on the state of the electronic device 100 or another device and the like). In particular, the microphone 160 may be provided in the electronic device 100, but may be provided outside and electrically connected to the electronic device 100. In another example, the microphone 160 may be provided outside of the electronic device 100 and connected to the electronic device 100 via wireless communication.

The inputter 170 may be an input interface configured to receive a user input for controlling the electronic device 100. The inputter 170 may receive the text input from the user. In another example, the inputter 170 may receive a user command for determining the threshold grade among the plurality of risk grades. In still another example, the inputter 170 may receive an input of a user command for changing the threshold value.

The inputter 170 may include a touch panel for receiving an input of a user touch using user's finger or a stylus pen, a button for receiving user manipulation, and the like. In addition, the inputter 170 may be implemented as other input devices (e.g., keyboard, mouse, motion inputter, and the like).

The sensor 180 may detect various types of state information of the electronic device 100. For example, the sensor 180 may include a movement sensor for detecting movement information of the electronic device 100 (e.g., gyro sensor, acceleration sensor, or the like), and may include a sensor for detecting position information (e.g., global positioning system (GPS) sensor), a sensor for detecting presence of a user (e.g., camera, UWB sensor, IR sensor, proximity sensor, optical sensor, or the like), and the like. In addition, the sensor 180 may further include an image sensor for capturing an image of the outside of the electronic device 100.

Embodiments of the disclosure may be implemented as software including instructions stored in machine (e.g., computer)-readable storage media. The machine is a device which invokes instructions stored in the storage medium and is operated according to the invoked instructions, and may include a server cloud according to the disclosed embodiments. In a case where the instructions are executed by a processor (e.g., processor 120), the processor may perform a function corresponding to the instruction directly or using other elements under the control of the processor.

The instructions may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product (e.g., downloadable app) may be at least temporarily stored or temporarily generated in a machine-readable storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. An electronic device comprising:
a memory storing instructions; and
at least one processor configured to execute the instructions to:
obtain an inquiry from a user of a target device, the inquiry being formatted as a text;
determine semantic roles of sentence components in the text by inputting information on the text to a first model trained to determine the semantic roles of the sentence components, wherein the first model is trained to determine each of the sentence components of the text as one of an agent, a recipient, and a predicate;
input the sentence components to a second model trained with a reduced amount of training data to:
output a risk level of the text based on the semantic roles of the sentence components; and
based on a sentence component determined as at least one of the agent and the recipient being the user or the target device, increase the risk level of the text;
identify an unknown sentence component of the sentence components that is not recognized by the second model;
obtain a synonym of the unknown sentence component from a database;
obtain the risk level of the text by inputting the semantic roles and sentence components, with the synonym in place of the unknown sentence component, to the second model;
identify a dangerous situation based on the risk level of the text being equal to or higher than a threshold; and
based on the dangerous situation being identified, perform an operation corresponding to the risk level of the text among a plurality of operations, the plurality of operations comprising performing a power-off of the target device, blocking network connection of the target device, re-starting of the target device, and turning off a background application which is running at the target device.

2. The electronic device according to claim 1, wherein the second model is trained to output the risk level of the text by using a weight value matching to the synonym.

3. The electronic device according to claim 1, wherein the second model is trained to output one of a plurality of grades corresponding to a degree of risk as the risk level of the text.

4. The electronic device according to claim 1, wherein the second model is trained to output the risk level of the text as a value representing a degree of risk.

5. The electronic device according to claim 1, wherein the target device is at least one of the electronic device or another electronic device.

6. The electronic device according to claim 1, further comprising:
a communicator comprising circuitry,
wherein the at least one processor is further configured to execute the instructions to, based on the risk level of the text being equal to or higher than a threshold grade or a threshold value:
control the communicator to transmit the text and the operation corresponding to the risk level to a server managing the target device, or
provide an alert message regarding a situation corresponding to the text and the operation corresponding to the risk level.

7. The electronic device according to claim 1, wherein the at least one processor is further configured to execute the instructions to, based on the risk level of the text being equal to or higher than a second threshold grade or a second threshold value, perform a power-off operation of the target device.

8. The electronic device according to claim 1, wherein the at least one processor is further configured to execute the instructions to obtain the information on the text comprising a result of sentence parsing the text by inputting the text to a sentence parsing model trained to perform the sentence parsing.

9. The electronic device according to claim 1, further comprising:
   a microphone,
   wherein the at least one processor is further configured to execute the instructions to, based on a user voice input inquiring for a state of the target device being received via the microphone, inputting the user voice input to an auto speech recognition (ASR) model to obtain the text.

10. A method for controlling an electronic device, the method comprising, using at least one processor:
    obtain an inquiry from a user of a target device, the inquiry being formatted as a text;
    determining semantic roles of sentence components in the text by inputting information on the text to a first model trained to determine the semantic roles of the sentence components, wherein the first model is trained to determine each of the sentence components of the text as one of an agent, a recipient, and a predicate;
    inputting the sentence components to a second model trained with a reduced amount of training data to:
       output a risk level of the text based on the semantic roles of the sentence components; and
       based on a sentence component determined as at least one of the agent and the recipient being the user or the target device, increase the risk level of the text;
    identifying an unknown sentence component of the sentence components that is not recognized by the second model;
    obtaining a synonym of the unknown sentence component from a database;
    obtaining the risk level of the text by inputting the semantic roles and sentence components, with the synonym in place of the unknown sentence component, to the second model;
    identifying a dangerous situation based on the risk level of the text being equal to or higher than a threshold; and
    based on the dangerous situation being identified, performing an operation corresponding to the risk level of the text among a plurality of operations, the plurality of operations comprising performing a power-off of the target device, blocking network connection of the target device, re-starting of the target device, and turning off a background application which is running at the target device.

11. The method according to claim 10, wherein the second model is trained to output the risk level of the text by using a weight value matching to the synonym.

\* \* \* \* \*